UNITED STATES PATENT OFFICE 2,397,372

VULCANIZABLE COMPOSITION

Henry Shirley Rothrock and William Herman Wood, Wilmington, Del., assignors to E. I. du Pont de Nemours & Company, Wilmington, Del., a corporation of Delaware No Drawing. Application June 4, 1942,
Serial No. 445,754

15 Claims. (Cl. 260—4)

This invention relates to modifications in the properties of rubber and related synthetic elastomers.

Natural rubber is rapidly swelled or dissolved on exposure to oils or hydrocarbon solvents. The use of rubber-like materials in applications requiring direct contact with oils, as for example gaskets, manifolds, and gasoline hoses, has been met largely with synthetic polymers, such as neoprene, which are characterized by an extremely high degree of oil-resistance. These are however expensive and there is a definite need for rubber-like materials not necessarily possessing the very high oil-resistance shown by neoprene but nevertheless substantially more oil resistant than natural rubber. Such a need exists for example in such applications as rubber parts for gasoline engines, e. g., heater and radiator hoses, motor mountings, and ignition wire insulation, and household articles such as ice-cube trays for refrigerators and bath and sink mats. The highly oil-resistant rubber substitutes while entirely satisfactory for these uses are more expensive than natural rubber and are not as readily available in large quantities.

Further, certain synthetic rubbers possessing the desired resistance to oils are too tough and nervy to serve in soft rubber application. It is therefore desirable that the oil-resistance of the low-cost and readily available natural rubber be increased in order to fill the demand for soft rubber articles of somewhat better-than-usual resistance to common oils and greases. For certain applications it is even desirable to increase the already high oil-resistance of neoprene and other chloroprene polymers.

Previous efforts to modify natural rubber in order to improve its ability to withstand the solvent action of oils and liquid hydrocarbons have been largely confined to methods wherein the rubber molecule is subjected to chemical reaction. These methods include cyclization of rubber by strong acids or metal halide catalysts, halogenation, oxidation, or direct chemical combination of rubber with reagents such as phenols, formaldehyde, or maleic anhydride. Although certain of these reactions have produced products of improved oil-resistance, this desirable goal has been obtained only at great sacrifice in rubber-like properties. Thus these products for the most part are more resinous, less coherent, and less plastic than the parent natural product from which they are derived. Further, in the vulcanized state, these modified rubbers show lower mechanical strength and poorer low-temperature properties than unmodified natural rubber.

This invention has as an object an improvement in the oil resistance of vulcanizable, ethylenically unsaturated, polymeric, organic elastomers such as natural rubber and related synthetic elastomers without undesirable sacrifice of rubbery properties. Another object is a modified rubber of improved oil resistance, good mechanical strength and good low temperature properties. Other objects will appear hereinafter.

These objects are accomplished by the following invention wherein an ester of a beta-furylacrylic acid is blended, i. e., physically admixed, with an ethylenically unsaturated elastomer and the resulting composition is vulcanized.

The blending of beta-furylacrylic acid esters with an ethylenically unsaturated elastomer such as natural rubber can conveniently be carried out on a warm rubber mill by the technique ordinarily employed in the compounding of rubber for vulcanization. In a preferred form of the invention, smoked sheet rubber is milled to a soft, plastic sheet which adheres readily to the rolls and 33% by weight of methyl beta-(2-furyl) acrylate is added directly. The ester is readily absorbed by the rubber and complete addition is accomplished within 20 minutes. The temperature of the rolls may be varied, but is preferably held between 40° to 100° C. The temperature of the elastomer is usually somewhat higher than that of the rolls. The resulting transparent blend may be compounded immediately, without removal from the rolls, by any of the conventional rubber compounding formulas. The vulcanization of this modified rubber stock is neither accelerated nor retarded by the presence of the beta-(2-furyl)-acrylic acid ester. The time and temperature of the vulcanization may be varied according to the requirements of strength, modulus, and hardness desired for the cured stock.

In comparison with vulcanizates of natural rubber compounded by the same formula and vulcanized under the same conditions, the cured rubber/beta-furylacrylic acid ester compositions are substantially more resistant to hydrocarbon solvents such as gasoline, kerosene, or lubricating oils, and hence are more widely useful. The modified stocks are also more resistant to freezing and consequently they retain their elastic properties over a wider range of temperatures than is otherwise possible for natural rubber. Although the blends are softer and show slightly lower moduli than natural rubber, the mechanical strength, and aging characteristics are essentially the same.

Methyl beta-(2-furyl)-acrylate may be prepared by the method of Posner—J. prakt. Chem. (2) 82, 440 (1910), by condensing furfural with methyl acetate using metallic sodium as the condensing agent.

The more detailed practice of the invention is illustrated by the following examples, wherein parts given are by weight. There are of course many forms of the invention other than these specific embodiments.

Example I

Smoked sheet rubber, 75 parts, is milled at 40° C. to a smooth, plastic sheet which adheres to the rolls of the mill and forms a small bank between the rolls. Methyl beta-(2-furyl)-acrylate, 25 parts, is added to the bank with continued milling. The ester is rapidly absorbed by the rubber and the addition is complete in 20 to 30 minutes. The resulting transparent blend resembles rubber in appearance but is softer and less nervy. The product is then compounded with stearic acid, 2 parts; pine tar, 1.5 parts; Micronex, 50 parts; "Neozone" D, 0.6 part; "Thermoflex" A, 1.4 parts; "Zenite" B, 1.2 parts; zinc oxide, 5.0 parts; and sulfur, 3 parts. The compounding agents, particularly carbon in the form of a channel black, are more rapidly absorbed by this blend than by unmodified rubber and a uniform dispersion of the agents is obtained in a relatively short time. The compounded stock is vulcanized for 40 minutes at 140° C.

The resulting vulcanizate is substantially more resistant to the disintegrating action of kerosene than is natural rubber in the same form. Thus, the material retains its shape for 100 hours in kerosene at 100° C. while unmodified rubber is completely disintegrated in 12 to 24 hours under the same conditions. At lower temperatures, the effect of kerosene is also less marked with the methyl beta-(2-furyl) acrylate modified stock. Thus after 16 hours in kerosene at 85° C. the volume increase of this product is 142%, while untreated rubber increases 185% in volume. In addition to solvent-resistant properties this modified rubber composition shows improved low-temperature characteristics. A sample elongated 200% and frozen at —70° C. in the elongated state, retracts 10% when the temperature is raised to —52° C., and 50% when the temperature reaches —40° C. Under the same conditions natural rubber retracts 10% at —48° C., and 50% at —18° C. Although the modified stock is somewhat softer and exhibits a lower modulus than rubber, the tensile strength, elongation, and aging properties of the rubber are substantially unaltered by the presence of methyl beta-(2-furyl)-acrylate. It is particularly significant that vulcanized blends of rubber with a variety of other unsaturated materials including beta-furylacrylic acid, dimethyl fumarate, cinnamic acid, maleic anhydride, and methyl vinyl ketone are no more resistant than unmodified rubber vulcanizates to the disintegrating action of hot kerosene.

In the form of a gum stock vulcanizate, compounded with "Zenite" B, 1.2 parts; zinc oxide, 5.0 parts; and sulfur, 3 parts, the rubber/methyl beta-(2-furyl) acrylate composition shows less pronounced but still substantial improvements over rubber gum stocks in resistance to swelling on immersion in hydrocarbon solvents such as gasoline or kerosene. In other typical rubber properties the gum stock closely resembles unmodified rubber gum stocks.

Example II

Methallyl beta-(2-furyl) acrylate, 25 parts, is blended on a mill at 40° C. for about 15 to 30 minutes with smoked sheet rubber, 75 parts, which has previously been milled to a soft plastic state. The ester is rapidly absorbed and the resulting transparent stock is compounded as a tread stock and vulcanized in the manner described in Example I. The cured product is markedly superior to unmodified rubber tread stock in resistance to swelling and disintegration by hydrocarbon solvents and in resistance to freezing. The product is slightly lower in tensile strength than natural rubber tread stock but is comparable in modulus, elasticity, and resistance to aging and oxidation.

Example III

A mixture of methyl beta-(2-furyl) acrylate, 25 parts, octyl alcohol, 0.3 part, and sulfonated mineral oil essentially identical with that described in Example 3 of U. S. Patent 2,197,800, 4 parts, is prepared. This mixture is then added to 60% rubber latex, 125 parts, and the mixture is subjected to mild agitation by shaking for 24 hours at room temperature. The resulting intimate dispersion of modifying agent and rubber particles is coagulated by the addition of 50 parts of a 10% aqueous solution of aluminum sulfate. The soft coagulum is washed free of the dispersing agent on the corrugated rolls of a rubber wash mill and dried on smooth rolls at 70° C. for about 45 minutes. The resulting transparent product contains 20 to 25% of methyl beta-(2-furyl)-acrylate. This material is compounded as a tread stock and vulcanized at 140° C. for 40 minutes as described in Example I. The vulcanizate exhibits properties substantially identical to those of the products in Example I.

The incorporation of methyl beta-(2-furyl)-acrylate into rubber in a latex form permits the manufacture of articles such as dipped goods, impregnated cloth or paper, and sponge rubber products. The modified latex, 154 parts, is compounded with zinc oxide, 0.3 part, sulfur, 0.6 part, "Tepidone," 0.5 part, and Dispersed Antox, 0.6 part. A smooth wooden form is immersed in the latex and withdrawn with a steady motion. The thin film of latex on the form is allowed to dry in air at room temperature for 24 hours and then vulcanized by heating in an oven at 100° C. for 45 minutes. The resulting vulcanized products exhibit the improved oil-resistant properties previously described for methyl beta-(2-furyl) acrylate compositions in Example I.

Example IV

Methyl beta-(2-furyl) acrylate, 15 parts, is blended on a mill at 40° C. for 15 to 30 minutes with 100 parts of a chloroprene/acrylonitrile copolymer containing 11% of acrylonitrile, prepared by emulsion polymerization as described in the copending application of Frederick C. Wagner, Serial No. 434,785, filed March 14, 1942. The resulting plasticized stock is then compounded with stearic acid, 0.5 part; "Neozone" A, 2.0 parts; extra light calcined magnesia, 10.0 parts; "Thermax," 100 parts; zinc oxide, 10 parts; and sulfur, 1.0 part, and vulcanized for 40 minutes at 153.0° C. The cured product exhibits a measurable advantage over unmodified chloroprene-acrylonitrile interpolymer in oil-resistance. Thus, after immersion in kerosene at 100° C. for 48 hours, the methyl beta - (2 - furyl) acrylate/chloroprene-acrylonitrile interpolymer blend increases 12% in volume while the chloroprene-acrylonitrile interpolymer tread stock increases 19.3%. At 28° C., the increases in volume caused by immersion in kerosene for 48 hours are 4.5% and 5.6% respectively. The methyl beta-(2-furyl) acrylate also acts as a plasticizer for the chloroprene-acrylonitrile interpolymer. Thus, the modified tread stock exhibits a Shore hardness of 68 while that of the unmodified stock is 80. The stress-strain properties of vulcanized chloroprene-acrylonitrile interpolymer are only very slightly altered by the presence of methyl beta-(2-furyl) acrylate.

The chemical compositions of certain rubber chemicals mentioned in the examples are:

"Neozone" D—phenyl-beta-naphthylamine.
"Thermoflex" A—phenyl - beta - naphthylamine 50%; diphenyl-p-phenylenediamine 25%; dimethoxydiphenylamine 25%.
"Zenite" B—zinc salt of mercaptobenzothiazole 90%; di-o-tolylguanidine 10%.
"Tepidone"—a 60% aqueous solution of sodium dibutyldithiocarbamate.
Dispersed "Antox"—a water dispersion of a butyraldehyde-aniline condensation product.
"Thermax"—a soft grade of carbon black.
"Micronex"—channel black, a finely divided carbon black.

The present invention is generic to the use of any monomeric ester of any beta-furylacrylic acid including esters of saturated or unsaturated, mono- or polyhydric alcohols unsubstituted or substituted by groups such as halogens, nitroamino, or cyano groups, including ethyl β-2-furylacrylate (Ber. 24 144); allyl β-2-furylacrylate and β-2-furylacrylic monoglyceride prepared from the alcohol and β-2-furylacrylyl chloride in pyridine; 2-chloroethyl and p-hydroxyphenyl β-2-furylacrylates (Iowa State College J. Sci. 7, 419 (1933); methyl β-3-furylacrylate prepared by the reaction of 3-aldehydofurane, methyl acetate and sodium methylate; 2-nitroethyl, 2-aminoethyl and 1-cyanoethyl β-2-furylacrylates prepared from the corresponding alcohol and β-2-furylacrylyl chloride.

While the invention is of particular value in connection with natural (Hevea) rubber because of the extremely poor oil-resistance of this material, nevertheless the invention is applicable to any vulcanizable ethylenically unsaturated polymeric organic elastomer, e. g., natural products as well as polymers derived from dienes such as butadiene, isoprene, chloroprene and cyanoprene or interpolymers derived from two or more of these dienes. The scope of this invention also includes interpolymers of dienes with vinyl or vinylidene compounds such as, for example, esters of acrylic and methacrylic acid, styrene, vinylidene chloride, acrylonitrile and vinyl esters of organic acids. These polymers or interpolymers may be prepared by polymerization in bulk, in solution in organic solvents or in aqueous emulsion and, in general, according to known procedures. The polymerizations may be catalysed by metallic halides such as aluminum chloride or boron trifluoride or by peroxides such as hydrogen peroxide, benzoyl peroxide or lauroyl peroxide or salts of inorganic peracids such as sodium or ammonium persulfate, sodium perborate or potassium perchlorate.

In the practice of this invention, esters of a beta-furylacrylic acid are blended with rubber in amounts up to 45% by weight of the rubber. With natural rubber products comprising 15% to 45% are generally most suitable since these compositions exhibit the greatest oil-resistance and plasticity. However, lower proportions of the ester modifiers may be employed as plasticizers to produce soft blends of very moderately improved oil-resistance. Blends of natural rubber with more than 45% of a beta-furylacrylic acid ester are handled less satisfactorily on the mill and the liquid modifier tends to exude from the sample under pressure, even after vulcanization. Naturally, the optimum proportions of the modifier varies with different polymeric elastomers. Thus, with "Neoprene" 10-30% of the ester may be incorporated to yield a soft, plastic product while stiffer compositions, such as an interpolymer of butadiene with acrylonitrile, may be softened with 15-40% of the modifier.

The monomeric furylacrylic acid ester may be incorporated with the elastomer in solid form or in the form of a latex.

In addition to the compounding formulas described in the examples, the products obtained by the initial process of this invention may be compounded in any of a wide variety of formulas known to the art. Compounding ingredients include vulcanizing agents, accelerators, fillers, pigments and antioxidants. The vulcanization may be brought about by a variety of agents other than sulfur. Thus sulfur chloride, benzoyl peroxide, quinone, dinitrobenzene, trinitrobenzene, phenyldiazoaminobenzene or p-toluyl diazo amino-p-toluene may be used.

Vulcanized blends of elastomers with esters of β-furylacrylic acid may be employed in the manufacture of a wide variety of products such as raincoats and capes, boats, shoes, shoe soles and heels, mats, such as rug anchors and bath mats, floor covering compositions, coating compositions, wire insulation, gaskets, washers, elastic bands, and hose. The vulcanizates are particularly useful in articles which are frequently exposed to oils, greases or hydrocarbon solvents. Thus, hoses and gaskets for transporting oil and gasoline, flexible tubes for grease guns, gasoline engine mountings, gaskets and ignition wire, are uses for which the modified elastomers are particularly well suited.

Although the oil-resistance of the rubber/beta-furylacrylic acid ester compositions is not comparable to that of neoprene, the improvement over natural rubber permits their use in applications where moderate oil-resistance is required. Since the products may be vulcanized to any desired degree of hardness, a variety of uses are apparent. For example, the products may be employed to advantage as soft, intermediate layers in airplane fuel-cell liners. In this application it is essential that the intermediate layer have high elasticity so that the liner may retract to its former position after being punctured. A further requirement of the intermediate layer is that it possesses the ability to swell without disintegration on exposure to gasoline in order to seal the puncture and prevent fuel leakage. Thus, the special properties of rubber modified with beta-(2-furyl) acrylic acid esters are especially adapted to this application. Stiffer cures of the modified rubber may be used as substitutes for rubber in gasoline engine parts such as heater and radiator hoses, motor mountings, and ignition wire insulation. High modulus stocks may be employed in household applications such as ice-cube drawers for refrigerators, rubber sink and shower mats, and ring washers for preserve jars.

The above description and examples are intended to be illustrative only. Any modification of or variation therefrom which conforms to the spirit of the invention is intended to be included within the scope of the claims.

What is claimed is:

1. A vulcanizable composition comprising a vulcanizable, polymeric, conjugated diene elastomer and 15–45%, by weight of said elastomer, of a monomeric ester of a beta furylacrylic acid.

2. A vulcanizable composition comprising a vulcanizable, polymeric, conjugated diene elastomer and 15–45%, by weight of said elastomer, of a monomeric ester of a beta-(2-furyl)acrylic acid.

3. A vulcanizable composition comprising Hevea rubber and 15–45%, by weight of said rubber, of methyl beta-(2-furyl)acrylate.

4. Process for modifying the properties of vulcanizable conjugated diene polymers which comprises blending therewith 15–45%, by weight of said polymers, of a monomeric ester of a beta furylacrylic acid.

5. Process for modifying the properties of vulcanizable conjugated diene polymers which comprises blending therewith 15–45%, by weight of said polymers, of a monomeric ester of beta-(2-furyl)acrylic acid.

6. Process for modifying the properties of Hevea rubber which comprises blending therewith from 15 to 45%, by weight of the rubber, of methyl beta-(2-furyl)acrylate.

7. Process for modifying the properties of vulcanizable conjugated diene polymers which comprises blending therewith 15–45%, by weight of said polymers, of a monomeric ester of a beta furylacrylic acid and vulcanizing the composition thus made.

8. Process for modifying the properties of vulcanizable conjugated diene polymers which comprises blending therewith 15–45%, by weight of said polymers, of a monomeric ester of beta-(2-furyl)-acrylic acid and vulcanizing the composition thus made.

9. Process for modifying the properties of Hevea rubber which comprises blending therewith from 15 to 45%, by weight of the rubber, of methyl beta-(2-furyl)-acrylate and vulcanizing the composition thus made.

10. A vulcanizate of a composition comprising a vulcanizable, conjugated diene polymer and 15–45%, by weight of said polymer, of a monomeric ester of a beta furylacrylic acid.

11. A vulcanizate of a composition comprising a vulcanizable, conjugated diene polymer and 15–45%, by weight of said polymer, of a monomeric ester of beta-(2-furyl)acrylic acid.

12. A vulcanizate of a composition comprising a vulcanizable, conjugated diene polymer and 15–45%, by weight of said polymer, of methyl beta-(2-furyl)acrylate.

13. A vulcanizate of a composition comprising Hevea rubber and 15–45%, by weight of said rubber, of methyl beta-(2-furyl)acrylate.

14. A vulcanizable composition comprising a vulcanizable, polymeric, conjugated diene elastomer and 15–45%, by weight of the elastomer, of a monomeric alkyl ester of beta-(2-furyl)acrylic acid.

15. Compositions of claim 14 wherein the alkyl has from one to two carbon atoms.

HENRY SHIRLEY ROTHROCK.
WILLIAM HERMAN WOOD.